United States Patent
Ma et al.

(10) Patent No.: US 10,120,239 B2
(45) Date of Patent: Nov. 6, 2018

(54) VERTICAL PHOTO ALIGNMENT METHOD WITH MAINTAINING POSITION OF MASK UNCHANGED AND MANUFACTURE METHOD OF LIQUID CRYSTAL DISPLAY PANEL UTILIZING THE SAME

(71) Applicant: Shenzhen China Star Optoelectronics Technology Co., Ltd., Shenzhen (CN)

(72) Inventors: Chao Ma, Shenzhen (CN); Xiaolong Ma, Shenzhen (CN); Yungjui Lee, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 279 days.

(21) Appl. No.: 15/031,277

(22) PCT Filed: Feb. 26, 2016

(86) PCT No.: PCT/CN2016/074621
§ 371 (c)(1),
(2) Date: Apr. 22, 2016

(87) PCT Pub. No.: WO2017/139999
PCT Pub. Date: Aug. 24, 2017

(65) Prior Publication Data
US 2018/0052367 A1    Feb. 22, 2018

(30) Foreign Application Priority Data
Feb. 15, 2016 (CN) .......................... 2016 1 0086226

(51) Int. Cl.
G02F 1/1337    (2006.01)
G02F 1/1335    (2006.01)
(Continued)

(52) U.S. Cl.
CPC .... G02F 1/133753 (2013.01); G02F 1/13439 (2013.01); G02F 1/13624 (2013.01);
(Continued)

(58) Field of Classification Search
CPC ......... G02F 1/133753; G02F 1/133788; G02F 1/133707; G02F 2001/133757;
(Continued)

(56) References Cited

U.S. PATENT DOCUMENTS 6,466,296 B1 * 10/2002 Yamada .............. G02F 1/13334
                                                                349/130
7,414,689 B2 * 8/2008 Yang ................. G02F 1/134363
                                                                349/141
(Continued)

FOREIGN PATENT DOCUMENTS

CN          102314023 A      1/2012

*Primary Examiner* — Huyen Ngo
(74) *Attorney, Agent, or Firm* — Leong C. Lei

(57) ABSTRACT

In a provided vertical alignment method, a pixel region, and the pixel region is divided into four sub regions of equal sizes which each is designed to be a square, and a pattern unit on the mask comprises a photic region corresponding to one sub region and a shading region corresponding to the other three sub regions in shape and size. The mask is employed to implement linear UV light irradiation to one sub region according to a certain irradiation angle to obtain a alignment direction of the one sub region, and then, the position of the mask and the certain irradiation angle of the irradiation are maintained to be unchanged. By rotating the pixel region 90° with three times, and the irradiation is implemented to the other three sub regions. Accordingly, the four sub regions have four alignment directions different from one another.

12 Claims, 4 Drawing Sheets

(51) Int. Cl.
 *G02F 1/1343* (2006.01)
 *G02F 1/1362* (2006.01)
 *G02F 1/1333* (2006.01)

(52) U.S. Cl.
 CPC .. *G02F 1/133514* (2013.01); *G02F 1/133711* (2013.01); *G02F 1/133788* (2013.01); *G02F 2001/133354* (2013.01); *G02F 2001/133742* (2013.01)

(58) Field of Classification Search
 CPC ............ G02F 1/1337; G02F 1/133711; G02F 1/133514; G02F 2001/134345; C08F 20/00
 See application file for complete search history.

(56) References Cited

U.S. PATENT DOCUMENTS

| | | | | |
|---|---|---|---|---|
| 7,808,593 | B1* | 10/2010 | Kim | G02F 1/133788 349/123 |
| 8,345,201 | B2* | 1/2013 | Mizusaki | C08G 73/1046 349/124 |
| 2008/0297708 | A1* | 12/2008 | Yang | G02F 1/133788 349/136 |
| 2009/0284703 | A1* | 11/2009 | Shoraku | G02F 1/133753 349/129 |
| 2014/0176881 | A1* | 6/2014 | Nakanishi | G02F 1/133707 349/99 |

* cited by examiner

VERTICAL PHOTO ALIGNMENT METHOD WITH MAINTAINING POSITION OF MASK UNCHANGED AND MANUFACTURE METHOD OF LIQUID CRYSTAL DISPLAY PANEL UTILIZING THE SAME

FIELD OF THE INVENTION

The present invention relates to a display technology field, and more particularly to a vertical photo alignment method and a manufacture method of a liquid crystal display panel.

BACKGROUND OF THE INVENTION

The Liquid Crystal Display (LCD) is one of the most widely utilized flat panel displays, and the liquid crystal display panel is the core component of the Liquid Crystal Display. The liquid crystal panel generally comprises a Color Filter Substrate (CF Substrate), a Thin Film Transistor Array Substrate (TFT Array Substrate) and a Liquid Crystal Layer arranged between the two substrates. Generally, the pixel electrode and the common electrode are respectively arranged on the array substrate and the color filter substrate. As the voltages are applied to the pixel electrodes and the common electrodes, the electrical field can be generated in the liquid crystal layer, and the electrical field determines the orientation of the liquid crystal molecules, and then to adjust the polarization of the light incident into the liquid crystal layer for making the liquid crystal display panel show images.

As a leader in a flat panel display, the liquid crystal display possesses properties of low power consumption, excellent display quality and higher production yield, and now has been gradually dominates the flat panel display field. In the liquid crystal display, the classifications of the liquid crystal display modes based on the liquid crystal operation mode mainly comprise: phase change (PC), twisted nematic (TN), super twisted nematic (STN), Vertical Alignment (VA), In plane Switching (IPS) and fringe field switching (FFS). In these various display technologies, the alignments are different. At present, in the production of the liquid crystal display panel, the alignment skill which is widely used is Rubbing alignment. The Rubbing alignment is to use fabric roller to perform contacting directional mechanical friction on the macromolecular surface. The energy provided by rubbing the macromolecular surface make the macromolecular main chain be aligned in direction due to the extension, and thus the liquid crystal orientation and alignment are controlled. The Rubbing alignment can provide stronger alignment ability for the liquid crystal molecules. However, in the rubbing process, the pollutions of the electrostatic and particles will generate due to the contacting friction of the fabric, and these pollutions often cause the damage of the liquid crystal element. Therefore, either in the academia or in the industry, the non contact alignment has been continuously researched and improved. Not only the pollutions of the electrostatic and particles can be prevented, the alignment of the liquid crystal molecules can be controlled more easily. With the non contact alignment, the small area alignment can be implemented with the mask having some particular pattern for manufacturing the liquid crystal element of special needs. The well known non contact alignment is irradiate the alignment agent having photosensitizer with the linearly polarized UV light, which is so called the UV light alignment, and also named as the photo alignment.

The photo alignment is to use the linearly polarized UV light to irradiate on the polymer alignment film having photosensitizer to make the polymer possess the alignment ability. The merit is that the pollution to the surface of the glass substrate can be prevented, and the small area alignment can be conducted, and the pattern alignment can be done with the mask, and with utilizing the angle of the incident light and the duration of the irradiation time, the parameters of the liquid crystal unit, such as the pre-tilted angle, the surface orientation strength can be controlled. The photo alignment agent is a kind of Polymer, which is consisted of many monomer small molecule bonds. By baking or irradiating thereto, the monomers are bonded with one another to form the macromolecules. In the liquid crystal alignment, for aligning the liquid crystal molecules along the alignment direction of the alignment molecules, the long chain molecules are formed after the selected monomers are bonded.

The photo alignment skill can achieve that all the liquid crystal molecules are in the state of overall tilting along the designed direction with the alignment film. The liquid crystal molecules can tilt toward one direction at the same time after applying the electrical field, and the response speed is raised. Because a plurality of regions can be divided without the protrusions and the slits. The aperture ratio is raised in comparison with the panel in which the protrusions are used for dividing the plurality of regions, and the light leakage due to the scattering of the protrusion and slit parts can be prevented to raise the contrast of the liquid crystal display panel. However, as considering the view angle property and the color deviation under circumstance of the tilt angle, the panel has to be partitioned so that the liquid crystal tilts in one sub pixel can have many directions for compensating the tilt angle properties and the color deviation. As utilizing the mask for partitioning the panel, the movement of the mask will result in the alignment precision loss and influence the panel quality.

SUMMARY OF THE INVENTION

An objective of the present invention is to provide a vertical photo alignment method, in which each pixel region is divided into four sub regions to obtain the alignment film having four alignment directions, and the four sub regions have different alignment directions, and the alignment precision is high, and the method is simple, and the cost is low.

Another objective of the present invention is to provide a manufacture method of a liquid crystal display panel, which utilizes the aforesaid vertical photo alignment method to respectively implement vertical photo alignment to the CF substrate and the TFT substrate, and the alignment precision is high, and the obtained the liquid crystal display panel possesses the properties of wide view angle, high transmission rate, non color deviation, high contrast and high resolution.

For realizing the aforesaid objectives, the present invention first provides a vertical photo alignment method, comprising steps of:

step 1, providing a substrate, and the substrate comprises a plurality of pixel regions aligned in array, and each pixel region is a square, and the pixel region is divided into four square sub regions of equal sizes;

step 2, coating a layer of photo alignment polymer on the substrate to form a photo alignment film;

step 3, providing a mask, and the mask comprises a plurality of pattern units aligned in array, and a shape and a size of the pattern unit are the same as a shape and a size of the pixel region, and each pattern unit comprises a transparent photic region and an opaque shading region, and shapes and sizes of the photic region and the shading region are respectively the same as shapes and sizes of one sub regions and other three sub regions of the pixel region;

step 4, positioning the substrate on a rotatable stage, and employing the mask to implement linear UV light irradiation to the photo alignment film on the substrate according to a certain irradiation angle, and then, the linear UV light aslant penetrates the photic region of the mask and correspondingly irradiates on one sub regions of the plurality of pixel regions to form a first alignment direction on the photo alignment film corresponding to the sub regions of the plurality of pixel regions; maintaining a position of the mask and an irradiation direction of the linear UV light constantly unchanged in the step 4, and sequentially rotating the substrate 90° with three times through the stage, and continuing implementing linear UV light irradiation to the photo alignment film on the substrate after each rotation, and the linear UV light aslant penetrates the photic region on the mask sequentially and correspondingly irradiates on the other three sub regions of the plurality of pixel regions in order, and thus to sequentially form a second alignment direction, a third alignment direction, a fourth alignment direction on the photo alignment film corresponding to the three sub regions of the plurality of pixel regions to obtain the alignment film having four alignment directions and each pixel region comprises sub regions having four alignment directions.

In the step 4, the linear UV light irradiation is implemented to the photo alignment film according to the irradiation angle that an included angle between the linear UV light and the substrate is 80°-89.7°.

In the step 1, the provided substrate is a TFT substrate or a CF substrate.

In the step 4, the substrate is rotated clockwise or counter clockwise.

In the step 2, the photo alignment polymer coated on the substrate is polyimide material.

The present invention further provides a manufacture method of a liquid crystal display panel, comprising steps of:

step 10, providing a TFT substrate and a CF substrate, and the TFT substrate and the CF substrate respectively comprise a plurality of pixel regions which are aligned in array and correspond to each other; each pixel region is a square, and the pixel region is divided into four square sub regions of equal sizes, which respectively are a first sub region, a second sub region, a third sub region and a fourth sub region sequentially aligned clockwise or counter clockwise;

step 20, respectively coating a layer of photo alignment polymer on the TFT substrate and the CF substrate to respectively form photo alignment films;

step 30, providing a mask, and the mask comprises a plurality of pattern units aligned in array, and a shape and a size of the pattern unit are the same as a shape and a size of the pixel region, and each pattern unit comprises a transparent photic region and an opaque shading region, and shapes and sizes of the photic region and the shading region are respectively the same as shapes and sizes of one sub regions and other three sub regions of the pixel region;

step 40, positioning the CF substrate on a rotatable stage, and employing the mask to implement linear UV light irradiation to the photo alignment film on the CF substrate according to a certain irradiation angle, and then, the linear UV light aslant penetrates the photic region of the mask and correspondingly irradiates on the first sub regions of the plurality of pixel regions to form a first alignment direction on the photo alignment film corresponding to the first sub regions of the plurality of pixel regions; maintaining a position of the mask and an irradiation direction of the linear UV light constantly unchanged in the step 40, and sequentially rotating the substrate 90° with three times through the stage, and continuing implementing linear UV light irradiation to the photo alignment film on the substrate after each rotation, and the linear UV light aslant penetrates the photic region on the mask sequentially and correspondingly irradiates on the second sub region, the third sub region and the fourth sub region of the plurality of pixel regions in order, and thus to sequentially form a second alignment direction, a third alignment direction, a fourth alignment direction on the photo alignment film corresponding to the second sub region, the third sub region and the fourth sub region of the plurality of pixel regions;

step 50, positioning the TFT substrate on the rotatable stage, and maintaining the position of the mask and the irradiation direction of the linear UV light constantly unchanged in the step 50, and employing the mask to implement linear UV light irradiation to the photo alignment film on the TFT substrate according to a certain irradiation angle, and then, the linear UV light aslant penetrates the photic region of the mask and correspondingly irradiates on the second sub regions or the fourth sub regions of the plurality of pixel regions to form a fifth alignment direction on the photo alignment film corresponding to the sub regions of the plurality of pixel regions; sequentially rotating the substrate 90° with three times through the stage, and continuing implementing linear UV light irradiation to the photo alignment film on the TFT substrate after each rotation, and the linear UV light aslant penetrates the photic region on the mask sequentially and correspondingly irradiates on the other three sub regions of the plurality of pixel regions in order, and thus to sequentially form a sixth alignment direction, a seventh alignment direction, an eighth alignment direction on the photo alignment film corresponding to the three sub regions of the plurality of pixel regions;

step 60, oppositely assembling the TFT substrate and the CF substrate to obtain the liquid crystal display panel; then, the first sub region, the second sub region, the third sub region and the fourth sub region on the TFT substrate correspond to the first sub region, the second sub region, the third sub region and the fourth sub region on the CF substrate one by one; photo alignment directions of the first sub region, the second sub region, the third sub region and the fourth sub region on the TFT substrate are respectively perpendicular with photo alignment directions of the first sub region, the second sub region, the third sub region and the fourth sub region on the CF substrate.

In the step 40 and the step 50, the linear UV light irradiation is implemented to the photo alignment polymer layer according to the irradiation angle that an included angle between the linear UV light and the substrate is 80°-89.7°.

In the step 40, the CF substrate is rotated clockwise or counter clockwise.

In the step 50, the TFT substrate is rotated clockwise or counter clockwise.

The present invention further provides a vertical photo alignment method, comprising steps of:

step 1, providing a substrate, and the substrate comprises a plurality of pixel regions aligned in array, and each pixel region is a square, and the pixel region is divided into four square sub regions of equal sizes;

step 2, coating a layer of photo alignment polymer on the substrate to form a photo alignment film;

step 3, providing a mask, and the mask comprises a plurality of pattern units aligned in array, and a shape and a size of the pattern unit are the same as a shape and a size of the pixel region, and each pattern unit comprises a transparent photic region and an opaque shading region, and shapes and sizes of the photic region and the shading region are respectively the same as shapes and sizes of one sub regions and other three sub regions of the pixel region;

step 4, positioning the substrate on a rotatable stage, and employing the mask to implement linear UV light irradiation to the photo alignment film on the substrate according to a certain irradiation angle, and then, the linear UV light aslant penetrates the photic region of the mask and correspondingly irradiates on one sub regions of the plurality of pixel regions to form a first alignment direction on the photo alignment film corresponding to the sub regions of the plurality of pixel regions; maintaining a position of the mask and an irradiation direction of the linear UV light constantly unchanged in the step 4, and sequentially rotating the substrate 90° with three times through the stage, and continuing implementing linear UV light irradiation to the photo alignment film on the substrate after each rotation, and the linear UV light aslant penetrates the photic region on the mask sequentially and correspondingly irradiates on the other three sub regions of the plurality of pixel regions in order, and thus to sequentially form a second alignment direction, a third alignment direction, a fourth alignment direction on the photo alignment film corresponding to the three sub regions of the plurality of pixel regions to obtain the alignment film having four alignment directions and each pixel region comprises sub regions having four alignment directions;

wherein in the step 4, the linear UV light irradiation is implemented to the photo alignment film according to the irradiation angle that an included angle between the linear UV light and the substrate is 80°-89.7°;

wherein in the step 1, the provided substrate is a TFT substrate or a CF substrate.

The benefits of the present invention are: the present invention provides a vertical photo alignment method, and the pixel region is designed to be a square, and the pixel region is divided into four sub regions of equal sizes, and the pattern units on the mask corresponding to the pixel regions comprises the photic region and the shading region, wherein the shape and the size of the photic region are the same as the shape and the size of one sub region of the pixel region. First, the mask is employed to implement UV light irradiation to one sub region of the pixel region according to the certain irradiation angle to obtain the alignment direction of the sub region, and then, the position of the mask and the irradiation direction of the linear UV light are maintained to be unchanged. By rotating the substrate, and the mask continuously employed to implement linear UV light irradiation to the other three sub regions of the pixel region in order according to the certain irradiation angle for sequentially obtaining the alignment directions of the three sub regions. Namely, the alignment directions of the four sub regions of the pixel region are different from one another. Because the mask is constantly steady in the alignment process, the precision loss can be effectively reduced to raise the exposure precision, and thus the alignment precision is high, and the method is simple, and the cost is low; the present invention provides a manufacture method of a liquid crystal display panel, which utilizes the aforesaid vertical photo alignment method to respectively implement vertical photo alignment to the CF substrate and the TFT substrate, and the alignment precision is high, and the alignment directions of the corresponding sub regions on the CF substrate and the TFT substrate are mutually perpendicular, therefore, the obtained the liquid crystal display panel possesses the properties of wide view angle, high transmission rate, non color deviation, high contrast and high resolution.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
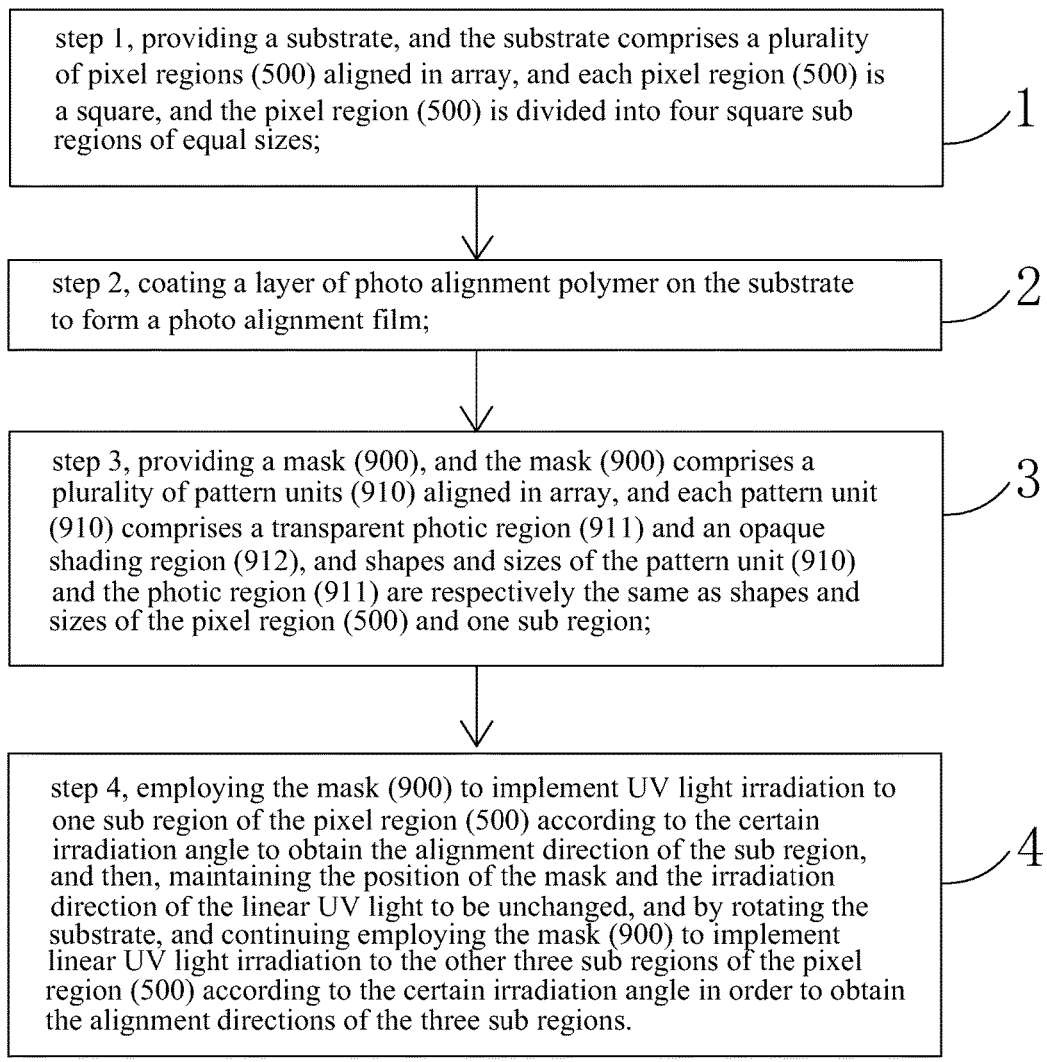
FIG. 1 is a flowchart of a vertical photo alignment method of the present invention.
Figure 2:
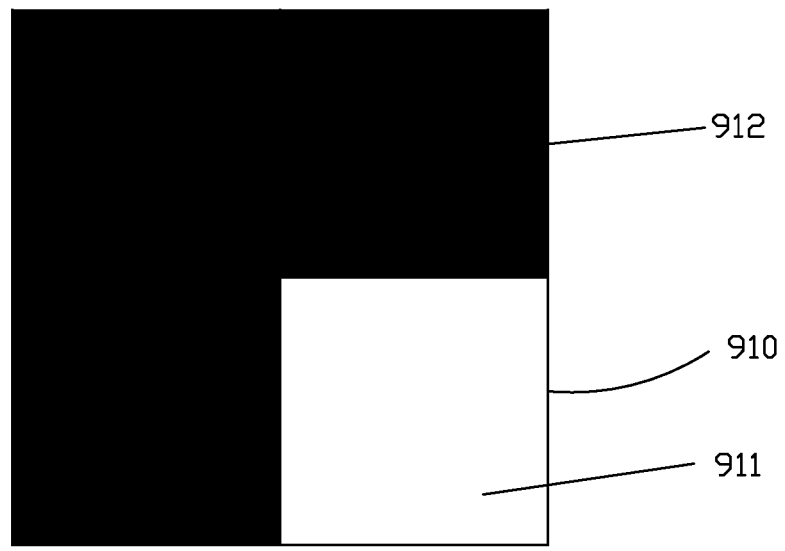
FIG. 2 is a structure diagram of a pattern unit on a mask provided in the step 3 of the vertical photo alignment method according to the present invention.
Figure 3:
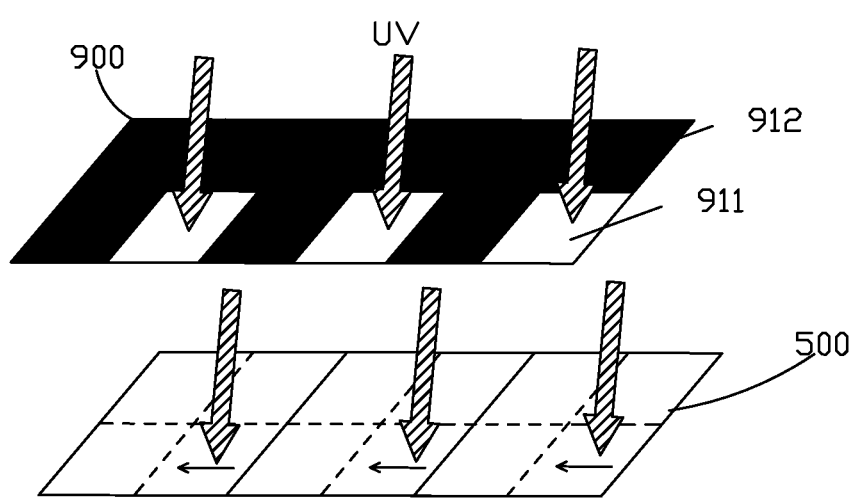
FIG. 3 is a diagram of the step 4 of the vertical photo alignment method according to the present invention.

Please refer to FIG. 1. The present invention provides a vertical photo alignment method, comprising steps of:

step 1, providing a substrate, and the substrate comprises a plurality of pixel regions 500 aligned in array, and each pixel region 500 is a square, and the pixel region 500 is divided into four square sub regions of equal sizes;

Specifically, in the step 1, the provided substrate is a TFT substrate or a CF substrate.

step 2, coating a layer of photo alignment polymer on the substrate to form a photo alignment film;

Specifically, in the step 2, the photo alignment polymer coated on the substrate is polyimide material.

step 3, providing a mask 900, and the mask 900 comprises a plurality of pattern units 910 aligned in array, and a shape and a size of the pattern unit 910 are the same as a shape and a size of the pixel region 500, and as shown in FIG. 2, each pattern unit 910 comprises a transparent photic region 911 and an opaque shading region 912, and shapes and sizes of the photic region 911 and the shading region 912 are respectively the same as shapes and sizes of one sub regions and other three sub regions of the pixel region 500;

step 4, as shown in FIG. 3, positioning the substrate on a rotatable stage, and employing the mask 900 to implement linear UV light irradiation to the photo alignment film on the substrate according to a certain irradiation angle, and then, the linear UV light aslant penetrates the photic region 911 of the mask 900 and correspondingly irradiates on one sub regions of the plurality of pixel regions 500 to form a first alignment direction on the photo alignment film corresponding to the sub regions of the plurality of pixel regions 500; maintaining a position of the mask 900 and an irradiation direction of the linear UV light constantly unchanged in the step 4, and sequentially rotating the substrate 90° with three times through the stage, and continuing implementing linear UV light irradiation to the photo alignment film on the substrate after each rotation, and the linear UV light aslant penetrates the photic region 911 on the mask 900 sequentially and correspondingly irradiates on the other three sub regions of the plurality of pixel regions 500 in order, and thus to sequentially form a second alignment direction, a third alignment direction, a fourth alignment direction on the photo alignment film corresponding to the three sub regions of the plurality of pixel regions 500 to obtain the alignment film having four alignment directions and each pixel region comprises sub regions having four alignment directions.

Specifically, in the step 4, the linear UV light irradiation is implemented to the photo alignment film according to the irradiation angle that an included angle between the linear UV light and the substrate is 80°-89.7°.

Figure 4:
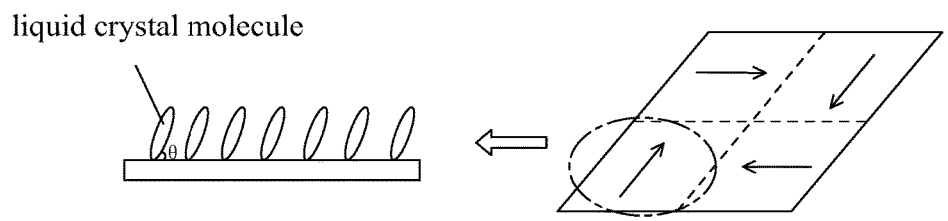
FIG. 4 is a diagram of orientation of the pixel regions after photo alignment to the liquid crystal molecules in the step 4 of the vertical photo alignment method according to the present invention.

Specifically, as shown in FIG. 4, the pixel regions 500 after the vertical photo alignment can make the liquid crystal orientated and aligned. Because in the alignment process, the alignment directions formed on the photo alignment film are along with the irradiation direction of the linear UV light irradiating thereon so that the liquid crystal molecules stand on the substrate by an included angle θ with the substrate.

Figure 5:
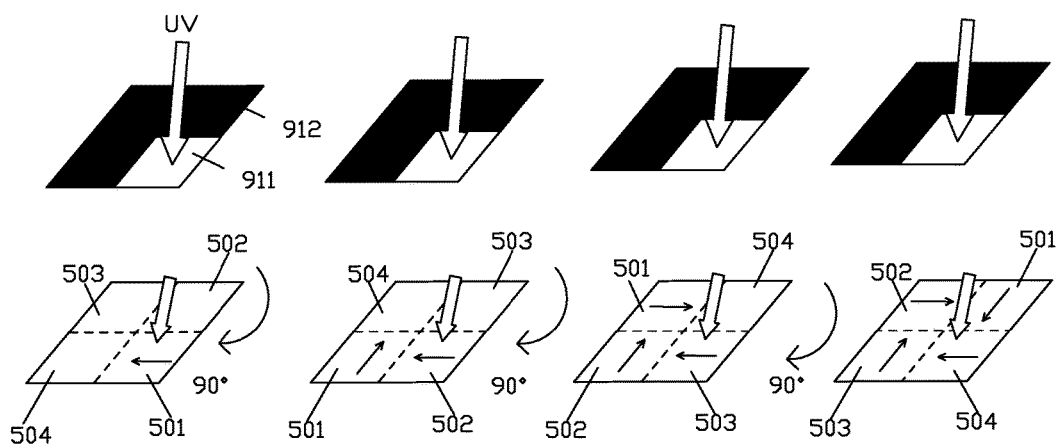
FIG. 5 is a diagram of the step 4 of a manufacture method of a liquid crystal display panel according to the present invention.

On the basis of the aforesaid vertical photo alignment method, the present invention further provides a manufacture method of a liquid crystal display panel, comprising steps of:

step 10, providing a TFT substrate and a CF substrate, and the TFT substrate and the CF substrate respectively comprise a plurality of pixel regions 500 which are aligned in array and correspond to each other; each pixel region 500 is a square, and the pixel region 500 is divided into four square sub regions of equal sizes, which respectively are a first sub region, a second sub region, a third sub region and a fourth sub region 501, 502, 503, 504 sequentially aligned clockwise or counter clockwise.

step 20, respectively coating a layer of photo alignment polymer on the TFT substrate and the CF substrate to respectively form photo alignment films.

step 30, providing a mask 900, and the mask 900 comprises a plurality of pattern units 910 aligned in array, and a shape and a size of the pattern unit 900 are the same as a shape and a size of the pixel region 500, and each pattern unit 910 comprises a transparent photic region 911 and an opaque shading region 912, and shapes and sizes of the photic region 911 and the shading region 912 are respectively the same as shapes and sizes of one sub regions and other three sub regions of the pixel region 500.

step 40, as shown in FIG. 5, positioning the CF substrate on a rotatable stage, and employing the mask 900 to implement linear UV light irradiation to the photo alignment film on the CF substrate according to a certain irradiation angle, and then, the linear UV light aslant penetrates the photic region 911 of the mask 900 and correspondingly irradiates on the first sub regions 501 of the plurality of pixel regions 500 to form a first alignment direction on the photo alignment film corresponding to the first sub regions 501 of the plurality of pixel regions 500; maintaining a position of the mask 900 and an irradiation direction of the linear UV light constantly unchanged in the step 40, and sequentially rotating the substrate 90° with three times through the stage, and continuing implementing linear UV light irradiation to the photo alignment film 700 on the substrate after each rotation, and the linear UV light aslant penetrates the photic region 901 on the mask 900 sequentially and correspondingly irradiates on the second sub region, the third sub region and the fourth sub region 502, 503, 504 of the plurality of pixel regions 500 in order, and thus to sequentially form a second alignment direction, a third alignment direction, a fourth alignment direction on the photo alignment film corresponding to the second sub region, the third sub region and the fourth sub region 502, 503, 504 of the plurality of pixel regions 500.

Figure 6:
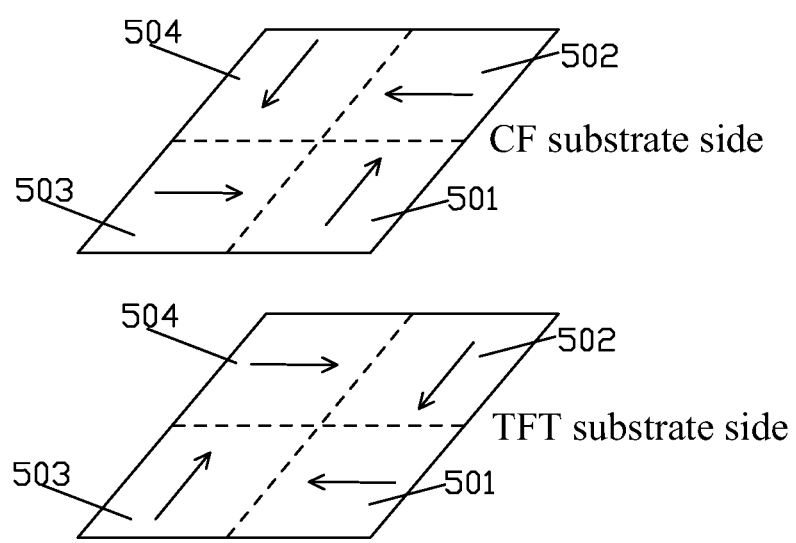
FIG. 6 is a diagram of alignment directions of the respective sub regions on the CF substrate and the TFT substrate in the liquid crystal display panel which is obtained in the step 6 of a manufacture method of a liquid crystal display panel according to the present invention.

Specifically, in the step 40, the CF substrate is rotated clockwise or counter clockwise.

step 50, positioning the TFT substrate on the rotatable stage, and maintaining the position of the mask 900 and the irradiation direction of the linear UV light constantly unchanged in the step 50, and employing the mask 900 to implement linear UV light irradiation to the photo alignment film on the TFT substrate according to a certain irradiation angle, and then, the linear UV light aslant penetrates the photic region 911 of the mask 900 and correspondingly irradiates on the second sub regions 502 or the fourth sub regions 504 of the plurality of pixel regions 500 to form a fifth alignment direction on the photo alignment film corresponding to the sub regions of the plurality of pixel regions 500; sequentially rotating the substrate 90° with three times through the stage, and continuing implementing linear UV light irradiation to the photo alignment film on the TFT substrate after each rotation, and the linear UV light aslant penetrates the photic region 911 on the mask 900 sequentially and correspondingly irradiates on the other three sub regions of the plurality of pixel regions 500 in order, and thus to sequentially form a sixth alignment direction, a seventh alignment direction, an eighth alignment direction on the photo alignment film corresponding to the three sub regions of the plurality of pixel regions 500.

step 60, oppositely assembling the TFT substrate and the CF substrate to obtain the liquid crystal display panel; then, as shown in FIG. 6, the first sub region, the second sub region, the third sub region and the fourth sub region 501, 502, 503, 504 on the TFT substrate correspond to the first sub region, the second sub region, the third sub region and the fourth sub region 501, 502, 503, 504 on the CF substrate one by one; photo alignment directions of the first sub region, the second sub region, the third sub region and the fourth sub region 501, 502, 503, 504 on the TFT substrate are respectively perpendicular with photo alignment directions of the first sub region, the second sub region, the third sub region and the fourth sub region 501, 502, 503, 504 on the CF substrate.

Specifically, in the step 40 and the step 50, the linear UV light irradiation is implemented to the photo alignment polymer layer according to the irradiation angle that an included angle between the linear UV light and the substrate is 80°-89.7°.

Specifically, in the step 50, the TFT substrate is rotated clockwise or counter clockwise.

In the manufacture method of the liquid crystal display panel according to the present invention, the pixel region can be divided into sub regions with many alignment directions without the protrusions and the slits. Then, the aperture ratio of the obtained liquid crystal display panel can be tremendously raised to possess high transmission rate, and to prevent the light leakage due to the scattering of the slit parts to raise the contrast of the liquid crystal display panel; besides, the pixel region is divided, thus, the liquid crystal corresponding to one pixel region in the liquid crystal display panel can have four tilted directions, and thus wider view angle and less color deviation can be achieved; meanwhile, in the vertical photo alignment process, the position of the mask 900 is maintained to be steady, and thus the precision loss can be effectively reduced to raise the exposure and alignment precisions.

In conclusion, the present invention provides a vertical photo alignment method, and the pixel region is designed to be a square, and the pixel region is divided into four sub regions of equal sizes, and the pattern units on the mask corresponding to the pixel regions comprises the photic region and the shading region, wherein the shape and the size of the photic region are the same as the shape and the size of one sub region of the pixel region. First, the mask is employed to implement UV light irradiation to one sub region of the pixel region according to the certain irradiation angle to obtain the alignment direction of the sub region, and then, the position of the mask and the irradiation direction of the linear UV light are maintained to be unchanged. By rotating the substrate, and the mask continuously employed to implement linear UV light irradiation to the other three sub regions of the pixel region in order according to the certain irradiation angle for sequentially obtaining the alignment directions of the three sub regions. Namely, the alignment directions of the four sub regions of the pixel region are different from one another. Because the mask is constantly steady in the alignment process, the precision loss can be effectively reduced to raise the exposure precision, and thus the alignment precision is high, and the method is simple, and the cost is low; the present invention provides a manufacture method of a liquid crystal display panel, which utilizes the aforesaid vertical photo alignment method to respectively implement vertical photo alignment to the CF substrate and the TFT substrate, and the alignment precision is high, and the alignment directions of the corresponding sub regions on the CF substrate and the TFT substrate are mutually perpendicular, therefore, the obtained the liquid crystal display panel possesses the properties of wide view angle, high transmission rate, non color deviation, high contrast and high resolution.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A vertical photo alignment method with maintaining a position of a mask unchanged, comprising steps of:
   step 1, providing a substrate, and the substrate comprises a pixel region, and the pixel region is a square, and is divided into four square sub regions of equal sizes, which respectively are a first sub region, a second sub region, a third sub region and a fourth sub region;
   step 2, coating a layer of photo alignment polymer on the substrate to form a photo alignment film;
   step 3, providing the mask, and the mask comprises a pattern unit, and a shape and a size of the pattern unit is the same as a shape and a size of the pixel region, and the pattern unit comprises a transparent photic region and an opaque shading region, and a shape and a size of the photic region is the same as a shape and a size of one sub region of the pixel region and a shape and a size of the shading region is the same as a shape and a size of other three sub regions of the pixel region;
   step 4, positioning the substrate on a rotatable stage, and employing the mask to implement linear UV light irradiation to the layer of photo alignment polymer on the substrate according to a certain irradiation angle, and then, the linear UV light aslant penetrates the photic region of the mask and correspondingly irradiates on the first sub region of the pixel region to form a first alignment direction on the layer of photo alignment polymer corresponding to the first sub region of the pixel region; maintaining the position of the mask and the certain irradiation angle of the linear UV light constantly unchanged in step 4, and sequentially rotating the pixel region of the substrate 90° with three times through the rotatable stage, and continuing implementing linear UV light irradiation to the layer of photo alignment polymer on the substrate after each rotation, and the linear UV light aslant penetrates the photic region on the mask sequentially and correspondingly irradiates on the second sub region, the third sub region and the fourth sub region of the pixel region in order according to the certain irradiation angle, and thus to sequentially form a second alignment direction, a third alignment direction, a fourth alignment direction on the layer of photo alignment polymer corresponding to the second sub region, the third sub region and the fourth sub region to obtain the alignment film having four alignment directions and the pixel region comprises the four sub regions having four alignment directions with the mask constantly steady in the vertical photo alignment method.

2. The vertical photo alignment method with maintaining the position of the mask unchanged according to claim 1, wherein in step 4, the linear UV light irradiation is implemented to the layer of photo alignment polymer according to the certain irradiation angle that an included angle between the linear UV light and the substrate is 80°-89.7°.

3. The vertical photo alignment method with maintaining the position of the mask unchanged according to claim 1, wherein in step 1, the provided substrate is a TFT substrate or a CF substrate.

4. The vertical photo alignment method with maintain the position of the mask unchanged according to claim 1, wherein in step 4, the pixel region of the substrate is rotated clockwise or counter clockwise by the rotatable stage.

5. The vertical photo alignment method with maintaining the position of the mask unchanged according to claim 1, wherein in step 2, the photo alignment polymer coated on the substrate is polyimide material.

6. A manufacture method of a liquid crystal display panel utilizing a vertical photo alignment method with maintain a position of a mask unchanged, comprising steps of:
   step 10, providing a TFT substrate and a CF substrate, and the TFT substrate and the CF substrate respectively comprise a pixel region and correspond to each other; the pixel region is a square, and is divided into four square sub regions of equal sizes, which respectively are a first sub region, a second sub region, a third sub region and a fourth sub region sequentially aligned clockwise or counter clockwise;
   step 20, respectively coating a layer of photo alignment polymer on the TFT substrate and the CF substrate to respectively form photo alignment films;
   step 30, providing the mask, and the mask comprises a pattern unit, and a shape and a size of the pattern unit is the same as a shape and a size of the pixel region, and the pattern unit comprises a transparent photic region and an opaque shading region, and a shape and a size of the photic region is the same as a shape and a size of one sub region of the pixel region and the shading region is the same as a shape and a size of other three sub regions of the pixel region;

step 40, positioning the CF substrate on a rotatable stage, and employing the mask to implement linear UV light irradiation to the layer of photo alignment polymer on the CF substrate according to a certain irradiation angle, and then, the linear UV light aslant penetrates the photic region of the mask and correspondingly irradiates on the first sub regions of the plurality of pixel regions to form a first alignment direction on the layer of photo alignment polymer corresponding to the first sub regions of the plurality of pixel regions; maintaining the position of the mask and the certain irradiation angle of the linear UV light constantly unchanged in step 40, and sequentially rotating the pixel region of the substrate 90° with three times through the rotatable stage, and continuing implementing linear UV light irradiation to the layer of photo alignment polymer on the substrate after each rotation, and the linear UV light aslant penetrates the photic region on the mask sequentially and correspondingly irradiates on the second sub region, the third sub region and the fourth sub region of the plurality of pixel regions in order according to the certain irradiation angle, and thus to sequentially form a second alignment direction, a third alignment direction, a fourth alignment direction on the layer of photo alignment polymer corresponding to the second sub region, the third sub region and the fourth sub region of the plurality of pixel regions with the mask constantly steady in the vertical photo alignment method;

step 50, positioning the TFT substrate on the rotatable stage, and maintaining the position of the mask and the certain irradiation angle of the linear UV light constantly unchanged in step 50, and employing the mask to implement linear UV light irradiation to the layer of photo alignment polymer on the TFT substrate according to the certain irradiation angle, and then, the linear UV light aslant penetrates the photic region of the mask and correspondingly irradiates on the second sub region or the fourth sub region of the pixel region to form a fifth alignment direction on the layer of photo alignment polymer corresponding to the second sub region or the fourth sub region of the pixel region; sequentially rotating the pixel region of the substrate 90° with three times through the rotatable stage, and continuing implementing linear UV light irradiation to the layer of photo alignment polymer on the TFT substrate after each rotation, and the linear UV light aslant penetrates the photic region on the mask sequentially and correspondingly irradiates on the third sub region, the fourth sub region and the first sub region or on the first sub region, the second sub region and the third sub region of the pixel region in order according to the certain irradiation angle, and thus to sequentially form a sixth alignment direction, a seventh alignment direction, an eighth alignment direction on the layer of photo alignment polymer corresponding to the third sub region, the fourth sub region and the first sub region or on the first sub region, the second sub region and the third sub region of the pixel region with the mask constantly steady in the vertical photo alignment method;

step 60, oppositely assembling the TFT substrate and the CF substrate to obtain the liquid crystal display panel; then, the first sub region, the second sub region, the third sub region and the fourth sub region on the TFT substrate correspond to the first sub region, the second sub region, the third sub region and the fourth sub region on the CF substrate one by one; photo alignment directions of the first sub region, the second sub region, the third sub region and the fourth sub region on the TFT substrate are respectively perpendicular with photo alignment directions of the first sub region, the second sub region, the third sub region and the fourth sub region on the CF substrate.

7. The manufacture method of the liquid crystal display panel according to claim 6, wherein in step 40 and step 50, the linear UV light irradiation is implemented to the layer of photo alignment polymer according to the certain irradiation angle that an included angle between the linear UV light and the substrate is 80°-89.7°.

8. The manufacture method of the liquid crystal display panel according to claim 6, wherein in step 40, the CF substrate is rotated clockwise or counter clockwise by the rotatable stage.

9. The manufacture method of the liquid crystal display panel according to claim 6, wherein in step 50, the TFT substrate is rotated clockwise or counter clockwise.

10. A vertical photo alignment method with maintaining a position of a mask unchanged, comprising steps of:

step 1, providing a substrate, and the substrate comprises a pixel region, and the pixel region is a square, and is divided into four square sub regions of equal sizes, which respectively are a first sub region, a second sub region, a third sub region and a fourth sub region;

step 2, coating a layer of photo alignment polymer on the substrate to form a photo alignment film;

step 3, providing the mask, and the mask comprises a pattern unit, and a shape and a size of the pattern unit is the same as a shape and a size of the pixel region, and the pattern unit comprises a transparent photic region and an opaque shading region, and a shape and a size of the photic region is the same as a shape and a size of one sub region of the pixel region and a shape and a size of the shading region is the same as a shape and a size of other three sub regions of the pixel region;

step 4, positioning the substrate on a rotatable stage, and employing the mask to implement linear UV light irradiation to the layer of photo alignment polymer on the substrate according to a certain irradiation angle, and then, the linear UV light aslant penetrates the photic region of the mask and correspondingly irradiates on the first sub region of the pixel region to form a first alignment direction on the layer of photo alignment polymer corresponding to the first sub region of the pixel region; maintaining the position of the mask and the certain irradiation angle of the linear UV light constantly unchanged in step 4, and sequentially rotating the pixel region of the substrate 90° with three times through the rotatable stage, and continuing implementing linear UV light irradiation to the layer of photo alignment polymer on the substrate after each rotation, and the linear UV light aslant penetrates the photic region on the mask sequentially and correspondingly irradiates on the second sub region, the third sub region and the fourth sub region of the pixel region in order according to the certain irradiation angle, and thus to sequentially form a second alignment direction, a third alignment direction, a fourth alignment direction on the layer of photo alignment polymer corresponding to the second sub region, the third sub region and the fourth sub region to obtain the alignment film having four alignment directions and the pixel region comprises the four sub regions having four alignment directions with the mask constantly steady in the vertical photo alignment method;

wherein in step 4, the linear UV light irradiation is implemented to the layer of photo alignment polymer according to the certain irradiation angle that an included angle between the linear UV light and the substrate is 80°-89.7°;

wherein in step 1, the provided substrate is a TFT substrate or a CF substrate.

11. The vertical photo alignment method with maintaining the position of the mask unchanged according to claim 10, wherein in step 4, the substrate is rotated clockwise or counter clockwise by the rotatable stage.

12. The vertical photo alignment method with maintaining the position of the mask unchanged according to claim 10, wherein in step 2, the photo alignment polymer coated on the substrate is polyimide material.

* * * * *